March 10, 1959  J. G. SCHABERG  2,876,643
GYROSCOPIC DEVICES
Filed Oct. 22, 1954
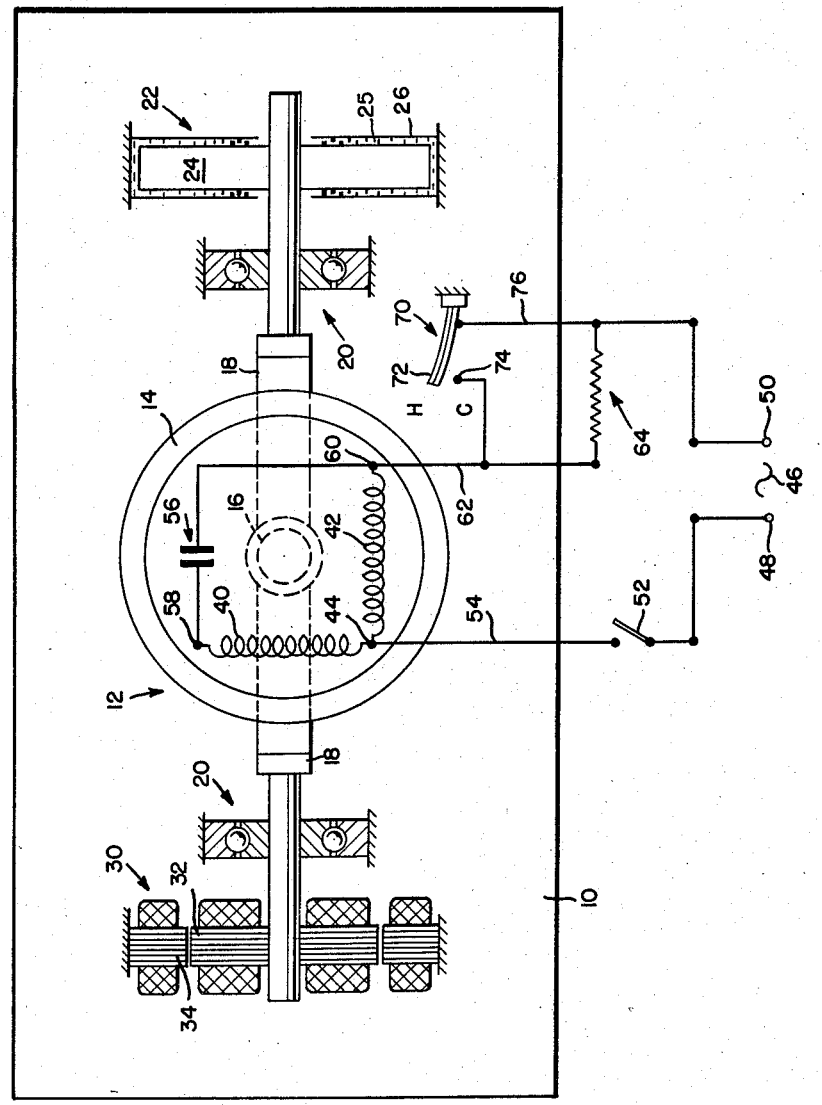
INVENTOR.
JOHANNES G. SCHABERG
BY *George H Fisher*
ATTORNEY

United States Patent Office 2,876,643
Patented Mar. 10, 1959

2,876,643

GYROSCOPIC DEVICES

Johannes G. Schaberg, St. Paul, Minn., assignor to Minneapolis-Honeywell Regulator Company, Minneapolis, Minn., a corporation of Delaware Application October 22, 1954, Serial No. 463,932

10 Claims. (Cl. 74—5.7)

My invention pertains to gyroscopes and more particularly to an improved type of gyroscope wherein means are provided for maintaining the temperature of the elements of the gyroscope at a constant level.

In a copending application, Serial No. 399,951, filed December 23, 1953, now Patent No. 2,712,757, I have disclosed an improved rate gyroscope comprising in part a viscous damper as well as a sensitive electromagnetic type pickoff. The viscous damper restrains displacement of the gyro about its output axis and the electromagnetic pickoff serves as a means of transmitting information pertaining to relative rotation between the housing and the gimbal structure to other control means. Other gyroscopic devices in the art contain other viscous damping arrangements as well as other sensitive pickoff devices. Generally, these pickoff devices and damping arrangements require a controlled operating temperature. Especially in the case of viscous dampers, the amount of damping produced is directly proportional to the viscosity of the damping fluid, the viscosity in turn depending upon the temperature thereof. Previous methods of maintaining the temperature of the apparatus of the gyro constant comprise some arrangement of having special heating units either internal or external of the gyro for producing sufficient heat to maintain the desired temperature of the device. My invention is directed to a means of maintaining a desired temperature in a gyroscopic device but eliminating the need of special heaters.

An object of my invention is to provide an improved gyroscopic device.

A more specific object of my invention is to control the temperature of a gyroscopic device by varying the energization level of the winding means driving the rotative part of the gyro spin motor.

A further object of the invention is to provide in a gyro comprising a spin motor and a viscous damper temperature responsive means adjacent to the viscous damper and the spin motor which control the energization level of the spin motor so as to adjust the wattage input thereto so as to maintain a constant temperature surrounding the spin motor and the viscous damper.

Other objects of my invention will be set forth more fully in and become apparent from a reading of the following specification and appended claims, in conjunction with the accompanying drawing in which the single figure depicts schematically a gyroscopic device embodying the teaching of my invention.

The gyroscopic device comprises a housing 10 containing in part a spin motor 12 having a rotor 14 mounted for rotation in a suitable bearing 16 of a gimbal frame 18. Gimbal 18 in turn is mounted for rotation in suitable bearings 20, the outer races of which are secured in some suitable fashion to housing 10. Restraining the rotation of gimbal frame 18 in bearings 20 is a viscous damper generally depicted by reference numeral 22 and which comprises an inner element 24 fastened to gimbal frame 18 and an outer housing portion 26 fastened in some suitable fashion to housing 10 with a suitable viscous fluid 25 disposed in the space between elements 24 and 26 of viscous damper 22.

A pickoff device 30, shown to be of the selsyn type, but which may be of any suitable type, is adapted to detect relative rotation between housing 10 and gimbal frame 18 and comprises an inner member 32 attached by suitable means to gimbal frame 18 and an outer stator member 34 fastened by suitable means to housing 10. Pickoff 30 would be energized by suitable means, not shown, so as to transmit signals proportional to relative rotation between rotor 32 and stator 34.

A pair of windings 40 and 42 are schematically shown and are adapted to be positioned so as to be in inductive relationship with rotor 14 of spin motor 12. One end of each of windings 40 and 42 is connected to a common point 44 which in turn is connected to a first terminal 48 of a source of alternating current 46 by means of a conductor 54 and a suitable switching device 52. A suitable condenser 56 is connected between the remaining ends of windings 40 and 42 as at points 58 and 60 respectively. Junction point 60 is adapted to be connected to the other side 50 of the source of alternating current 46 by means of a conductor 62 and a voltage dropping resistor 64. In some applications it may be desired to have voltage dropping resistor 64 positioned within housing 10 while in other applications it may be desired to have voltage dropping resistor 64 positioned external from housing 10. The voltage dropping resistor 64 is adapted to be shorted out of the energization circuit for spin motor 12 according to the position of a temperature responsive device 70 schematically represented as a bimetallic element 72 adapted to close with a fixed contact 74 upon a decrease in temperature and conversely to separate from fixed contact 74 upon a rise in temperature. Fixed contact 74 is connected to one side of voltage dropping resistor 64 and a lead 76 connects bimetallic element 72 to the other side of voltage dropping resistor 64. While a bimetallic temperature responsive device is shown as the temperature responsive means, it will be appreciated that other arrangements will become obvious to those skilled in the art of temperature control.

*Operation*

In order to explain the operation of this apparatus, it may be assumed that the gyroscope spin motor 12 has been deenergized for a sufficient length of time so as to allow rotor member 14 to come to rest as well as to allow the temperature within housing 10 to decrease from the desired operating temperature to some lower point. Accordingly, bimetallic element 72 will respond to the lower temperature by engaging fixed contact 74. When it is desired to put the gyroscopic device into operation, switch 52 may be closed applying full line voltage to the spin motor from the source of alternating current 46, the circuit being traced from terminal 48 through switch 52, conductor 54 to connection point 44 and thence through winding 42 to connection point 60 as well as through winding 40, connection point 58 and condenser 56 to connection point 60 and thence through conductor 62, stationary contact 74, bimetallic element 72, and lead 76 to terminal 50. Thus full line voltage is applied to spin motor 12, it being readily understood by those skilled in the art that condenser 56 shifts the phase of the current flowing through winding 40 with respect to the current flowing through winding 42 so as to create a rotating electromagnetic field which cooperates with rotor member 14 of spin motor 12 so as to cause the same to rotate, after a certain starting interval, at synchronous speed. Spin motor 12 is designed such that the power dissipated by it when full line voltage is placed across its winding is greater than the power necessary to maintain it at synchronous speed once said speed has been attained. Further, the spin motor design is so related to the overall size of the entire gyroscopic device that the wattage dissipated by the spin motor windings 40 and 42, when impressed with full line voltage, would tend to raise the temperature of the entire gyroscopic device including viscous damper 22 and pickoff 30 above the desired operating point, assuming the device were used in a normal application which is defined to include being installed in an aircraft designed to operate between sea level and the upper atmosphere. Windings 40 and 42 are related to the impedance of voltage dropping resistor 64 in such a manner that when bimetallic elements 72 separates from fixed contact 74, which occurs when the temperature of the gyroscopic device exceeds the desired point, that the reduced voltage impressed across windings 40 and 42 will be sufficient so as to maintain the synchronous speed of the rotor member 14. Thus when bimetallic element 72 is in contact with fixed contact 74, spin motor 12 has "starting current" flowing through windings 40 and 42 but when bimetallic element 72 separates from fixed contact 74, then a portion of the line voltage is dropped across voltage dropping resistor 64 and windings 40 and 42 have "running" current flowing therethrough. Thus, upon initial closure of switch 52 spin motor 12 will have the full starting current flowing through its windings 40 and 42 which quickly brings the rotor 14 up to near synchronous speed as well as quickly raising the temperature of the entire gyroscopic device up to the desired point, at which temperature bimetallic element 72 will separate from fixed contact 74 causing the current flowing through windings 40 and 42 to drop to the running level. The power dissipated by windings 40 and 42 while the running current is flowing therethrough is such that, after a certain length of time, the temperature of the gyroscopic device 10 will begin to decrease. Temperature responsive means 70 will then sense the lower temperature causing the circuit to again be completed between bimetallic element 72 and fixed contact 74 again shunting out voltage dropping resistor 64 so as to apply the "starting" current to motor windings 40 and 42 which, due to the increased wattage dissipation, will bring the temperature of the device back up to the desired temperature. It will be appreciated that the physical placement of the temperature responsive means with respect to the spin motor windings 40 and 42 as well as the general sensitivity of the temperature responsive means 70 will be dependent in part upon the relationship between temperature change and the effects thereof upon the viscous damper 22 and the pickoff 30.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. Gyroscopic apparatus of the class described comprising a housing, a synchronous spin motor in said housing and having a rotatable member and winding means adapted when energized at a first level to cause said member to rotate at synchronous speed, temperature responsive means in said housing, and means including said temperature responsive means for varying the energization level of said winding means between said first level and a second level higher than said first level so as to control the temperature in said housing.

2. Gyroscopic apparatus of the class described comprising a housing, a frame supported in said housing for rotation about at least one axis, a gyro spin motor supported by said frame and having a rotatable member and means adapted when energized to cause said rotatable member to rotate, means in said housing responsive to rotation of said frame about said axis, temperature responsive means in said housing, and means controlled by said temperature responsive means for varying the energization to said energizable motor means without appreciably affecting the rotation of said rotatable member so as to control the temperature in said housing.

3. A gyroscopic device of the class described comprising a housing, a gimbal, means mounting said gimbal in said housing for rotation about an axis, a spin motor mounted on said gimbal in said housing and having a rotatable member and winding means adapted when energized to cause said member to rotate, viscous damping means in said housing connected to said gimbal, temperature responsive means in said housing, and means controlled by said temperature responsive means for varying the energization level of said winding means without appreciably affecting the rotation of said rotatable member so as to control the temperature in said housing.

4. A gyroscopic device of the class described comprising a housing, a spin motor in said housing and having a rotatable member and winding means adapted when energized to cause said member to rotate, temperature responsive means, and means in circuit with said winding means and controlled by said temperature responsive means for varying the energization level of said winding means without appreciably affecting the rotation of said rotatable member so as to control the temperature in said housing.

5. A gyroscopic device of the class described comprising a housing, a spin motor in said housing and having a rotatable member and winding means adapted when energized to cause said member to rotate, temperature responsive means positioned within said housing so as to respond to the temperature of said housing, and resistance means in circuit with said winding means, said temperature responsive means causing said resistance means to be shunted out of circuit with said winding means when the temperature in said housing deviates from a selected point.

6. A gyroscopic device comprising a housing, a spin motor in said housing, winding means in said housing adapted when energized to cause rotation of said spin motor, temperature responsive means positioned in said housing so as to respond to the temperature in said housing, and means controlled by said temperature responsive means for varying the energization of said winding means without appreciably affecting the rotation of said spin motor.

7. A gyroscopic device comprising a spin motor having a rotor and winding means adapted when energized to cause rotation of said rotor, temperature responsive means positioned adjacent to said spin motor so as to respond to the temperature of said spin motor, and resistance means in circuit with said winding means and controlled by said temperature responsive means for varying the energization of said winding means.

8. Control apparatus comprising a motor having winding means adapted when energized to cause said motor to be actuated, temperature responsive means positioned so as to respond to the temperature of said motor, and means controlled by said temperature responsive means for varying the energization of said winding means without appreciably affecting the actuation of said motor so as to control the temperature of said apparatus.

9. Gyroscopic apparatus of the class described comprising a gimbal mounted for rotation about an axis, a spin motor mounted on said gimbal and having a rotor and winding means adapted when energized to cause said rotor to rotate, means damping rotation of said gimbal about said axis, means sensing rotation of said gimbal about said axis, temperature responsive means, and means controlled by said temperature responsive means without appreciably affecting the rotation of said rotor for varying the energization of said winding means so as to control the power dissipated therein.

10. Temperature control means for a gyroscopic device comprising a spin motor having a rotor and winding means adapted when energized to cause rotation of said rotor, said temperature control means comprising temperature responsive means positioned adjacent to said spin motor so as to repond to the temperature of said spin motor, and means controlled by said temperature responsive means for varying the energization of said winding means without appreciably affecting the rotation of said rotor, the variation in energization of said winding means causing a variation in heat dissipation by said windings and being of a sense to maintain said spin motor at a substantially constant temperature.

References Cited in the file of this patent

UNITED STATES PATENTS

| | | |
|---|---|---|
| 2,181,250 | Reichel | Nov. 28, 1939 |
| 2,256,475 | Esval | Sept. 23, 1941 |
| 2,512,342 | Larkin | June 20, 1050 |
| 2,605,641 | Barkalow | Aug. 5, 1952 |
| 2,687,647 | Ashworth et al. | Aug. 31, 1954 |
| 2,690,014 | Draper et al. | Sept. 28, 1954 |
| 2,741,922 | Nolan et al. | Apr. 17, 1956 |